US006298317B1

(12) United States Patent
Wiemann (10) Patent No.: US 6,298,317 B1
(45) Date of Patent: Oct. 2, 2001

(54) ENHANCED FUNCTIONAL TESTING THROUGH THE FILTRATION OF NON-SUBTLE MUTATIONS

(75) Inventor: Alan Wiemann, Menlo Park, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/237,286

(22) Filed: Jan. 25, 1999

(51) Int. Cl.$^7$ .................................................. G06F 9/45
(52) U.S. Cl. .................... 703/22; 703/14; 703/15; 716/5; 717/4
(58) Field of Search ................... 703/13–19, 22; 716/4.5; 717/4

(56) References Cited

U.S. PATENT DOCUMENTS

| | | | |
|---|---|---|---|
| 5,604,895 | * | 2/1997 | Raimi ....................................... 703/13 |
| 5,754,860 | * | 5/1998 | McKeeman et al. ...................... 717/4 |
| 5,963,739 | * | 5/1999 | Homeier ................................... 717/4 |

OTHER PUBLICATIONS

Offutt et al., "A Semantic Model of Program Faults", Proc. of the 1996 International Symposium on Software Testing and Analysis, pp. 195–200, Jan. 1996.*
Vargas et al., "Reliability Verification of Fault–Tolerant Systems Design Based on Mutation Anaylsis", Proc. XI Brazilian Integrated Circuit Design, pp. 55–58, Oct. 1998.*
Thevenod–Fosse et al., "An Experimental Study on Software Structural Testing: Deterministic versus Random Input Generation", Digest of Papers 21st International Symposium on Fault–Tolerant Computing, pp. 410–417, Jun. 1991.*
Offutt et al., "An Empiricial Evaluation of Weak Mutation", IEEE Transactions on Software Engineering, vol. 20, Issue 5, pp. 337–344, May 1994.*
Hayes et al., "Increased Software Reliability through Input Validation Analysis and Testing", Proc. 10th Inter. Symp. on Software Reliability Eng. pp. 199–209, Nov. 1999.*
Geist et al., "Estimation and Enhancement of Reat–time Software Reliability through Mutation Analysis", IEEE Transactions on Computers, vol. 41, Issue 5, pp. 550–558, May 1992.*

(List continued on next page.)

Primary Examiner—Kevin J. Teska
Assistant Examiner—Douglas W. Sergent (57) ABSTRACT

A function simulates and verifies a computer program by inserting a syntactic mutation into one of the source code modules comprising the program. The mutated computer program is compiled and subjected to a subtlety check which detects non-subtle (i.e., easily detectable) syntactic mutations. If the subtlety check identifies the inserted syntactic mutation as non-subtle, functional testing on this mutated computer program is terminated, and a new mutated computer program is generated. However, if the subtlety check determines that the syntactic mutation is subtle, the mutated computer program is subjected to additional regression testing. If the regression testing is able to detect the subtle syntactic mutation within a predetermined simulation period, functional testing is terminated and a new mutated computer program is generated. However, if the subtle syntactic mutation is not detected within the predetermined simulation period, a functional coverage deficiency in the functional verification test suite is noted, and the regression test suite is enhanced accordingly.

33 Claims, 7 Drawing Sheets

OTHER PUBLICATIONS

Hayek et al., "From Specification Validation to Hardware Testing: A Unified Method", Proc. International Test Conference, pp. 885–893, Jun. 1996.*

Martin et al., "Software and Hardware Quality Assurance: Towards a Common Platform for High Reliability", Proc. IEEE Int. Conf. on Communications, vol. 4, pp. 1324–1328, Apr. 1990.*

Vado et al., "A methodology for Validation Digital Circuits with Mutation Testing", Proc. IEEE Inter. Symp. on Circuits and Systems, vol. 1, pp. 343–346, May 2000.*

Aktouf et al., "Concurrent Testing of VLSI Digital Signal Processors using Mutation Based Testing", Proc. 1997 IEEE Inter. Symp. on Defect and Fault Tolerance in VLSI Systems, pp. 94–99, Oct. 1997.*

King et al., "A Fortran Language System for Mutation–Based Software Testing", Software Practice and Experienc, vol. 12, Issue 7, ppl 686–718, Jul. 1991.*

A. Jefferson Offutt et al., "A Semantic Model of Program Faults", Software Engineering Notes, Proceedings of the 1996 International Symposium on Software Testing and Analysis (ISSTA), vol. 21, No. 3, pp. 195–200 (Jan. 8–10, 1996).

Richard Hamlet, "Theoretical Comparison of Testing Methods", Software Engineering Notes, Proceedings of the ACM SIGSOFT '89 Third Symposium on Software Testing, Analysis, and Verification (TAV3), vol. 14, No. 8, pp. 28–37 (Dec. 13–15, 1989).

Lee VanHee, "Benchmarking Peer Review Proficiency", Peer Reviews, Software Defect Detection Efficiency, Sixth Annual Software Technology Conference, pp. 1–9 (Apr. 14, 1994) [on–line] Available http://www.deepharbor.com/sqa/proficiency.html.

* cited by examiner

Inplementation #3

```
          ⎧ For CNT = 1 to 5 DO
          ⎪     If I(CNT) < = 6 ——190
     188 ⎨         O(CNT) = I(CNT)
          ⎪     Else
          ⎩         O(CNT) = Ø
```

Module A With Subtle Mutation
187

| Input | Mutation Output | Correct Output | Input | Mutation Output | Correct Output | Input | Mutation Output | Correct Output |
|---|---|---|---|---|---|---|---|---|
| I(1)=1 | O(1)=1 | "1" | I(1)=1 | O(1)=1 | "1" | I(1)=1 | O(1)=1 | "1" |
| I(2)=2 | O(2)=2 | "2" | I(2)=2 | O(2)=2 | "2" | I(2)=2 | O(2)=2 | "2" |
| I(3)=3 | O(3)=3 | "3" | I(3)=3 | O(3)=3 | "3" | I(3)=3 | O(3)=3 | "3" |
| I(4)=4 | O(4)=4 | "4" | I(4)=4 | O(4)=4 | "4" | I(4)=4 | O(4)=4 | "4" |
| I(5)=5 | O(5)=5 | "5" | I(5)=7 | O(5)=0 | "0" | I(5)=6 | O(5)=6 | "0" |
| Test Vector #1 | | | Test Vector #2 | | | Test Vector #3 | | |

ENHANCED FUNCTIONAL TESTING THROUGH THE FILTRATION OF NON-SUBTLE MUTATIONS

THE FIELD OF THE INVENTION

The present invention relates generally to verifying the operation of computer programs, and, more particularly to an apparatus and method for functionally testing a computer program to determine if a test suite properly tests the computer program and to determine a likelihood that undetected functional bugs still exist the computer program.

BACKGROUND OF THE INVENTION

As computer programs increase in size and complexity, there is typically a corresponding increase in the number of syntactic errors introduced into the source code of these programs. Additionally, the increased size and complexity of today's computer programs make detection and isolation of these syntactic errors a much more difficult task.

The IEEE standard definition of an error is a mistake made by a developer. An error may lead to one or more software mutations (also known as faults). Mutations are located in the source code of a computer program. A mutation is a difference between an incorrect program and a corresponding correct program. The mutation may be localized in one statement or may be textually dispersed into several locations in the computer program. Similarly, the mutation may be repairable in many ways, with each one leading to a correct, but different program. See: Offutt, A. and Hayes J., *A Semantic Model of Program Faults*, Proceedings of the 1996 International Symposium on Software Testing and Analysis, May, 1996.

The above definition of a mutation refers to the syntactic nature of a mutation. If the mutation is being inserted into the computer program, then the syntactic nature of the mutation is described by corresponding changes to the computer program. If the mutation occurs naturally in the program, then the syntactic nature of the mutation is described by the number of changes needed to correct the program. Examples of syntactic characterizations of mutations include using an incorrect variable name, or checking to see if a called function fails. Such mutations are often caused by programmer's mistakes, such as typographical errors.

A mutation can also be characterized semantically. Each computer program P can be viewed as having a specification S that defines sets D (an input domain) and R (an output range), and a mapping from D to R $$\left(D \xrightarrow{S} R\right).$$

A semantic characterization of a mutation views the faulty computer program as containing a computation that produces incorrect output over some subset of the input domain. That is, the mapping of inputs to outputs $$\left(D \xrightarrow{P} R\right)$$

is incorrect $$\left(D \xrightarrow{P} R \neq D \xrightarrow{S} R\right)$$

for some subset of D.

The characterization of mutation as "semantic" and "syntactic" proves quite useful when considering the size of a mutation. For a syntactically small mutation, one token or one statement may be incorrect. For a semantically small mutation, P's behavior on a very small subset of D is incorrect. A mutation that is syntactically small can result in a mutation that is very large semantically, because, the syntactic mutation can affect arbitrarily many inputs. Also, a major syntactic mutation in P may affect only a few inputs, resulting in a small semantic mutation. Finally, there are cases where a small semantic mutation can be modeled as small syntactic mutations, and small syntactic mutations can result in small semantic mutations.

There are significant behavioral differences between syntactically small/semantically large mutations and syntactically small/semantically small mutations. Syntactically small/semantically large mutations are of little value during the functional testing and verification process. This is evidenced by the fact that syntactically small/semantically large mutations are readily detected by almost any test case that reaches the mutated statement. These syntactically small/semantically large mutations are also subject to a high degree of overlap. That is, a testing/verification test case that kills one syntactically small/semantically large mutation will almost always kill many other syntactically small/semantically large mutations. Conversely, the subtle, syntactically small/semantically small mutations are much harder to detect during normal functional testing and verification. Thus, detection of these subtle, syntactically small/semantically small mutations will lead to higher quality tests.

Prior art software functional testing and verification systems have focused on mutations that are small syntactically, without consideration to semantic size. As mentioned in the previous paragraph, mutations that are small syntactically but are large semantically are easily detected by a very simple set of test vectors; they add difficulty to the functional testing and verification process without increasing the testing value of the resulting regression test cases. Syntactically small faults (mutants) typically have a large semantic size and, consequently fail to increase the value of resulting test cases.

In view of the above, there is a need for a system for detecting and discarding syntactically small faults having a large semantic size, and for integrating this concept into a functional simulation and verification system to determine a likelihood that undetected functional bugs exist in a software program and if a test suite properly tests the computer program.

SUMMARY OF THE INVENTION

The present invention provides a functional testing system for functionally simulating and verifying the correctness of a computer program. The functional testing system of the present invention includes a mutation generator for generating a series of mutated computer programs, wherein each mutated computer program has a syntactic mutation. The functional testing system of the present invention also includes a first functional simulator for serially processing each mutated computer program. This first functional simulator identifies whether the syntactic mutation in each mutated computer program is a non-subtle syntactic mutation. If the syntactic mutation is indeed a non-subtle syntactic mutation, the functional simulation of the mutated computer program containing the non-subtle syntactic mutation is terminated. The first function simulator then identifies each syntactic mutation not identified as a non-subtle mutation as a subtle mutation. The functional testing system of the present invention further includes a second functional simulator for serially processing each mutated computer program having a subtle syntactic mutation. The second functional simulator terminates the functional simulation of each mutated computer program if it detects the subtle syntactic mutation within a predetermined simulation period. However, if the second functional simulator does not detect the subtle syntactic mutation within the predetermined simulation period, the second function simulator provides an indication that the subtle syntactic mutation was not detected.

In one embodiment of the present invention, the computer program includes a plurality of source code modules. In a preferred embodiment of the present invention, the plurality of source code modules are functional models of an integrated circuit. The mutation generator identifies a set of eligible source code modules from the plurality of source code modules which are candidates for insertion of a syntactic mutation. A syntactic mutation is then inserted into a member selected from the set of eligible source code modules. The selection of a member from the set of eligible source code modules is done randomly, or by a distribution scheme which reflects the actual usage of the modules within the operating computer program.

The mutation generator selects a syntactic mutation for insertion within an eligible source code module from a predefined set of syntactic mutation types. The selection of the syntactic mutation is done randomly, or by a distribution scheme which reflects the probability of encountering the mutation type during normal operation of the computer program. The types of syntactic mutations selected for insertion include but are not limited to: logical negation errors, logical term omissions, logical factor omissions, incorrect logical terms, incorrect logical factors, incorrect numerical values, and case omissions.

Upon completion of the functional simulation of the computer program, the present invention provides a user with a statistically derived probability that undetected actual mutations still reside within the computer program.

The present invention also provides a method for functionally simulating and verifying the correctness of a computer program. The method begins by generating a mutated computer program which includes a syntactic mutation. The method next pre-processes the mutated computer program to identify the syntactic mutation within the mutated computer program as either a subtle or non-subtle syntactic mutation. If the mutated computer program has a non-subtle syntactic mutation, the functional simulation of the mutated computer program is terminated, and another mutated computer program is generated, as described above. If the mutated computer program contains a subtle syntactic mutation, the mutated computer program is then simulated in an attempt to detect the subtle syntactic mutation within the mutated computer program within a predetermined simulation period. If the subtle syntactic mutation is detected within a predetermined simulation period, the functional simulation of the mutated computer program is terminated, and another mutated computer program is generated, as described above. However, if the subtle syntactic mutation is not detected within a predetermined simulation period, the present invention provides an indication that the subtle syntactic mutation was not detected.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
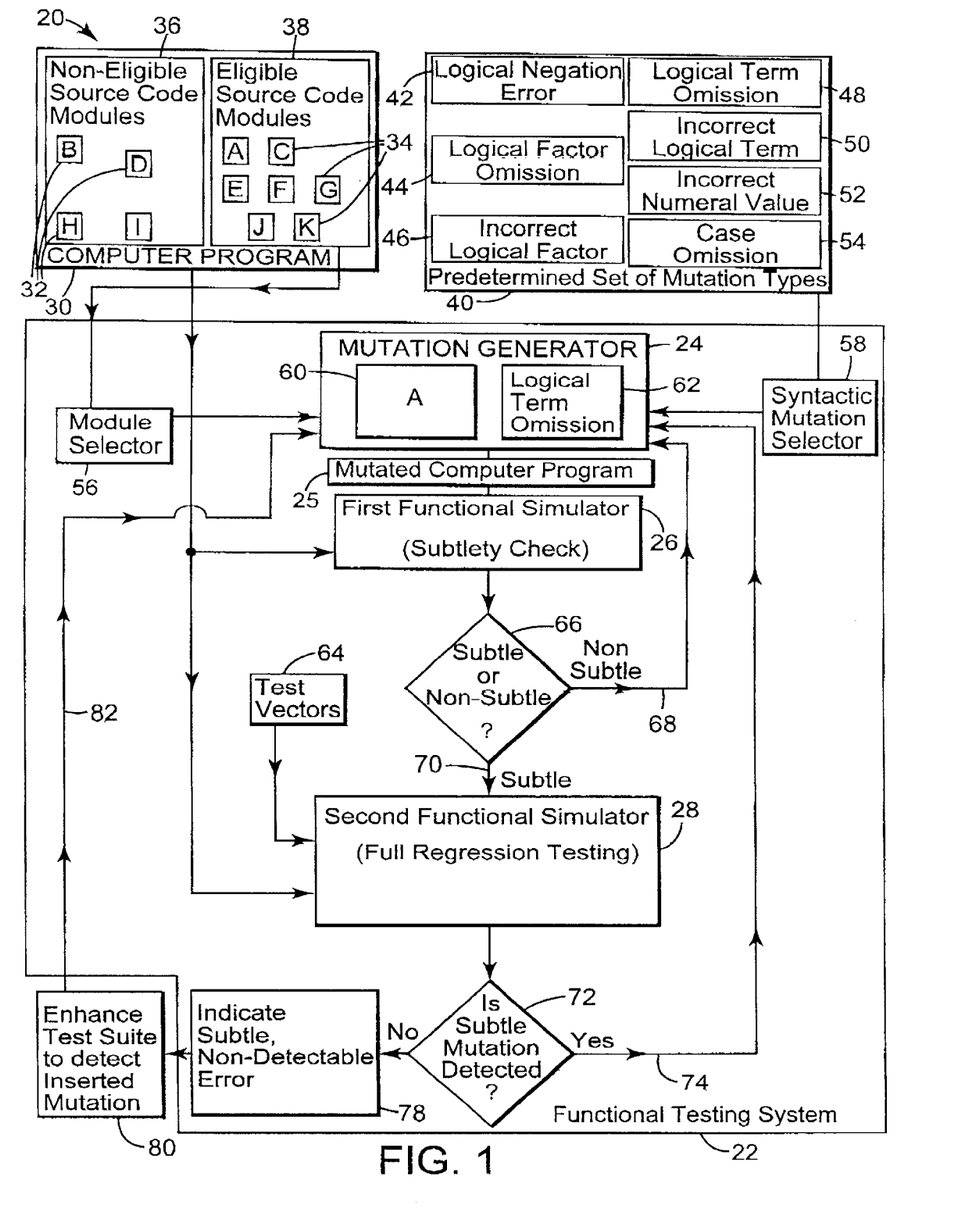
FIG. 1 is a functional block and flow diagram of a functional testing and verification environment in accordance with the present invention.

FIG. 1 is a block and flow diagram of a functional testing and verification environment 20 which in accordance with the present invention includes a functional testing system 22 for simulating and verifying the correctness of a computer program. Functional testing system 22 includes a mutation generator 24, a first functional simulator 26, and a second functional simulator 28.

Functional testing and verification environment 20 also includes a computer program 30 which undergoes functional testing by functional testing system 22, and a predefined set of syntactic mutation types 40, which can be selectively inserted into computer program 30 before the computer program undergoes functional testing. Within the context of the present invention, computer program 30 is a set of statements, instructions, and/or data to be used directly or indirectly within a computer in order to bring about a certain result. Computer program 30 can be in the form of software, firmware or programmable hardware. Embodiments of computer program 30 within the context of the present invention include, but are not limited to, models of processes and physical devices such as integrated circuits. Computer program 30 includes one or more source code modules 32 and 34. A first general classification group 36 includes source code modules 32, which are not candidates for insertion of a syntactic mutation. A second general classification group 38 includes source code modules 34 which are candidates for insertion of a syntactic mutation. A module selector 56 selects one source code module 34 from group 38 which are candidates for insertion of a syntactic mutation, and passes the selected module onto mutation generator 24. Syntactic mutation selector 58 selects one type of syntactic mutation from predefined set of syntactic mutation types 40 and passes the selected syntactic mutation type onto mutation generator 24. Illustrative examples of syntactic mutation types found within predefined set of syntactic mutation types 40 include: logical negation errors 42; logical factor omissions 44; incorrect logical factors 46; logical term omissions 48; incorrect logical terms 50; incorrect numerical values 52; case omissions 54; and other such syntactic mutation types.

After receiving a selected source code module 60 and a selected mutation type, mutation generator 24 inserts an actual mutation of the selected type of mutation into source code module 60, and recompiles the computer program with the newly created mutated source code module such that a new, mutated computer program 25 is created. In some instances, the mutation generator is unable to insert an actual mutation of the selected type of mutation into selected source code module 60, because the source code within the selected module does not support the selected mutation. In this instance, a new source code module and mutation type are selected and passed to mutation generator 24.

The resultant mutated computer program 25 is processed by a first functional simulator 26 which performs a subtlety check on the mutated computer program. In one embodiment the subtlety check is implemented as a suite of very basic tests that exercises the basic functionality of mutated computer program 25. The set of basic tests is constructed based on knowledge gained through ordinary testing of the computer program during the development process. If the mutation introduced into the computer program is so gross that the basic operation of the computer program is disturbed, the mutation is classified as a non-subtle mutation, as illustrated at 66. Such a non-subtle mutation is typically a mutation having a small syntactic size, but a large semantic size. If the mutation is classified as a non-subtle mutation, no further functional testing is performed on the mutated computer program, because the mutation is already successfully identified by the basic subtlety check performed by first functional simulator 26, and a full regression test on non-subtle mutations provides essentially no benefit to the overall functional test result. Therefore, if first functional simulator 26 identifies the mutated computer program as containing a non-subtle mutation, control is passed back to mutation generator 24 via path 68. Module selector 56 selects a new source code module 34, syntactic mutation selector 58 selects a new syntactic mutation type, and mutation generator 24 generates a new mutated computer program.

If first functional simulator 26 does not identify the mutated computer program as containing a non-subtle mutation, mutated computer program 25 is identified as containing a subtle mutation. The mutated computer program containing the subtle mutation is passed onto a second functional simulator 28 via path 70. Second functional simulator 28 performs a much more thorough and time-consuming functional test than that performed by first functional simulator 26. Second functional simulator 28 performs a full regression test utilizing a suite of test vectors 64 on the mutated computer program.

If the subtle mutation present within the mutated computer program is detected by second functional simulator 28 within a predetermined quantity of testing, as indicated at 72, the mutated computer program is identified as containing a subtle, detectable mutation, and control is passed back to mutation generator 24 via path 74. Module selector 56 selects a new source code module 34, syntactic mutation selector 58 selects a new syntactic mutation type, and mutation generator 24 generates a new mutated computer program. However, if the subtle mutation present within the mutated computer program is not detected by second functional simulator 28 within a predetermined quantity of testing, as indicated at 72, the mutated computer program is identified as containing a subtle, non-detectable mutation, and an indication of the detection of the subtle, non-detectable error is provided, as indicated at 78. At this point, the functional test suite 64 employed by second functional simulator 28 is enhanced in order to detect the subtle, non-detectable error present within the current mutated computer program. After the test suite has been enhanced, control is passed back to mutation generator 24 via path 82. Module selector 56 selects a new source code module 34, syntactic mutation selector 58 selects a new syntactic mutation type, and mutation generator 24 generates a new mutated computer program.

Figure 2:
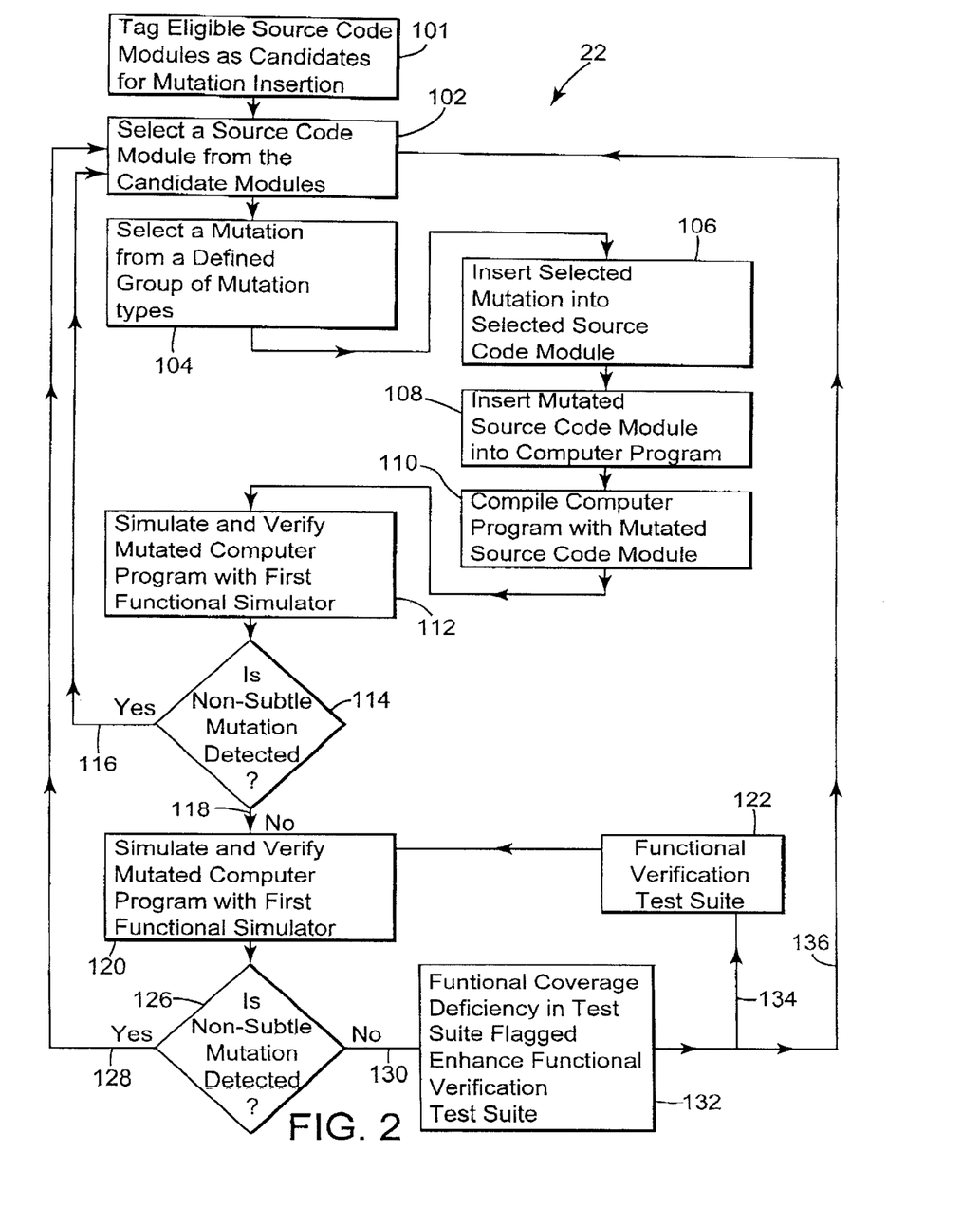
FIG. 2 is a process flow diagram of a functional testing and verification system in accordance with the present invention.

FIG. 2 is a process flow diagram illustrating the operation of functional testing system 22 operating in functional testing and verification environment 20 of FIG. 1 in accordance with the present invention. The functional testing and verification process begins by tagging eligible source code modules found within the computer program 30 as candidates for insertion of a mutation, as indicated at block 101. In some instances, insertion of a mutation within a source code module is not desirable or even possible. For example, some source code modules cannot be mutated by any of the predefined set of mutation types 40, because none of the predefined set of mutation types is applicable to the source code contained within the source code module. In one embodiment, control source code modules within a computer program are tagged as eligible for mutation, while data source code modules are tagged as ineligible. Thus, in this embodiment, at block 101, the source code modules of the computer program are segregated into a first group of eligible source code modules 38 for insertion of the mutation and a second group of ineligible source code modules 36 for the insertion of the mutation.

After a group of source code modules eligible for insertion of a mutation has been identified, as indicated at block 101, a single source code module is selected from the group, as indicated at block 102. In one embodiment of the present invention, the source code module selected from the group of eligible modules is chosen randomly. In an alternative embodiment of the present invention, the selection of a source code module from the group of eligible modules occurs according to a given distribution scheme, wherein the distribution scheme reflects actual operating conditions of the computer program. Thus, if during actual operation of the computer program, 50% of the execution time of the program is spent in module "A", 25% of the execution time of the program is spent in module "B", and 25% of the execution time of the program is spent in module "C", the selection of modules for insertion of a mutation is biased such that module "A" is selected approximately twice as often as modules "B" and "C".

Upon completion of the selection of a source code module from the eligible source code modules, as indicated at block 102, a single mutation type is selected from a defined group of mutation types, as indicated at block 104. In one embodiment of the present invention, the mutation type selected from the group of mutation types is chosen randomly. In an alternative embodiment of the present invention, the mutation type selected from the group of mutation types occurs according to a given distribution scheme, wherein the distribution scheme reflects actual operating conditions of the computer program. Thus, if during previous testing of the computer program, 50% of the mutations detected were of the type "logical term omissions", 25% of the mutations detected were of the type "logical negation error", and 25% of the mutations detected were "case omissions", the selection of mutation types for insertion within the source code module is biased such that mutation type "logical term omissions" is selected approximately twice as often as mutation types "logical negation error" and "case omissions".

After the mutation type has been selected from a defined group of mutation types, as indicated at block 104, a mutation of the selected mutation type is inserted into the selected source code module, as indicated at block 106, creating a mutated source code module. Next, the mutated source code module is inserted into the computer program, as indicated at block 108. The computer program containing the mutated source code module is then compiled, as indicated at block 110, creating a mutated computer program.

The mutated computer program is next simulated and verified with first functional simulator 26, as indicated at block 112. As described earlier, first functional simulator 26 performs a subtlety check on the mutated computer program. In one embodiment, subtlety check is implemented as a minimal suite of tests that executes basic operation of the mutated computer program. If any of the executed basic operations of the mutated computer program are disturbed by the inserted mutation, first functional simulator 26 identifies the mutation as non-subtle (e.g. small syntactic change, large semantic change), as indicated at block 114. At this point, no further functional simulation is performed, and process control is passed back to block 102, where a new source code module and mutation type are selected. Thus, the first functional simulator performs the subtlety check to quickly filter out the non-subtle mutations from further testing, since further simulation and verification of non-subtle mutations provides no further insight. In many instances, the vast majority of small syntactic mutations introduced into the source code modules of the computer programs produce large semantic changes, and are thus classified as non-subtle. By quickly identifying and filtering out this large percentage of non-subtle mutations, the efficiency of the functional testing process is greatly enhanced.

If the syntactic mutation within the computer program is identified by first functional simulator 26 as subtle, the mutated computer program is subjected to a more thorough and time consuming second functional simulation performed by second functional simulator 28, as indicated at block 120. Second functional simulator 28 performs a full regression test to detect the subtle mutation within the mutated computer program. If second functional simulator 28 detects the subtle mutation within a predetermined quantity of testing, as indicated at block 126, no further functional simulation is performed, and process control is passed back to block 102 via path 128, where a new source code module and mutation type are selected. However, if second functional simulator 28 does not detect the subtle mutation within a predetermined quantity of testing, a functional coverage deficiency in the test suite is flagged and a notification of the functional coverage deficiency is provided, as indicated at block 132. At this point, the functional verification test suite is enhanced to address the functional coverage deficiency, as indicated at block 122. In one embodiment, the test suite is enhanced manually by a verification engineer. In another embodiment, the process of enhancing the test suite is automated through the use of one or more computer programs.

After the functional verification test suite has been enhanced to detect the subtle mutation, process control is passed back to block 102 via path 136, where a new source code module and mutation type are selected.

Figure 3:
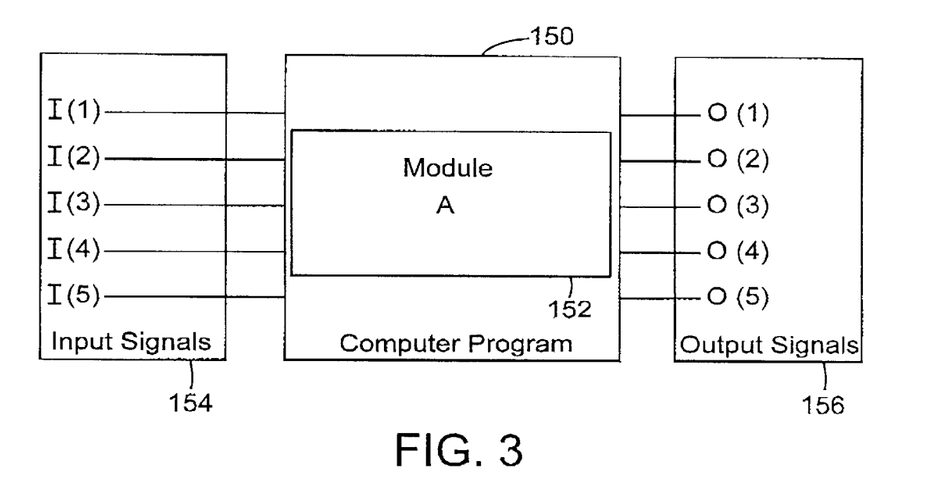
FIG. 3 is an illustrative example of a computer program having one source code module, a set of inputs, and a set of outputs.

FIG. 3 is an illustrative example of a computer program 150 having a single source code module 152, a set of inputs 154, and a set of outputs 156. This highly simplified example is presented to illustrate and provide a better understanding of the basic concepts of syntactic mutations, semantic mutations, subtle and non-subtle mutations as applied within the context of the functional testing and verification environment 20 of the present invention. In actual practice, computer programs simulated and verified by functional testing system 22 of the present invention are likely to be highly complex entities having a multitude of hierarchically related source code modules, wherein mutation errors are often masked by several layers of logic.

The computer program 150 of this illustrative example includes single source code module (Module "A") 152. A set of five inputs 154 and a set of five outputs 156 provide the I/O interface to/from computer program 150. The five inputs are defined as I(1), I(2), I(3), I(4), and I(5). The five outputs are defined as O(1), O(2), O(3), O(4), and O(5).

Figure 4:
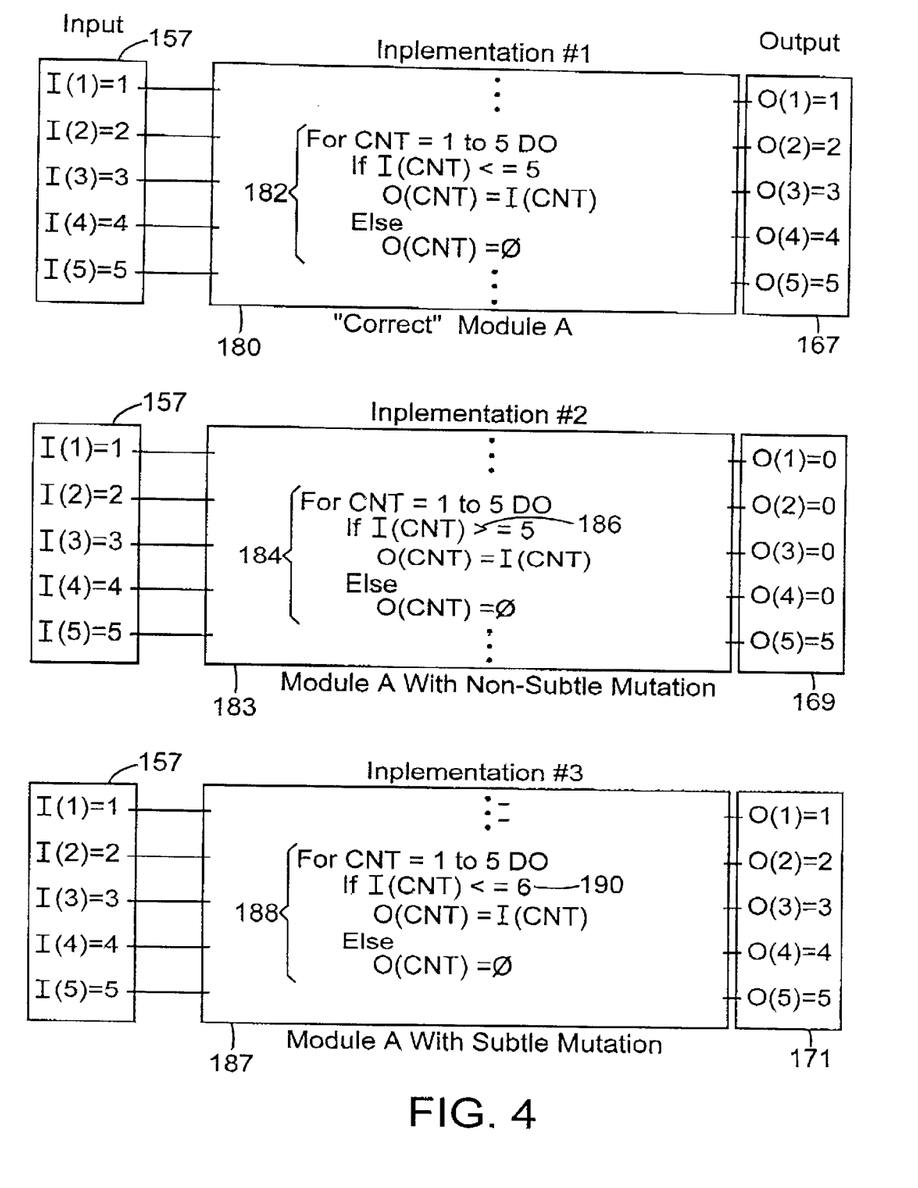
FIG. 4 illustrates three simplified implementations of the source code module illustrated in FIG. 3, wherein the first implementation contains a correct source code segment, the second implementation introduces a non-subtle mutation into the correct source code segment, and the third implementation introduces a subtle mutation into the correct source code segment, and wherein all three implementations are subjected to a first functional simulation (subtlety check).

FIG. 4 illustrates three simplified implementations of the source code module "A" as illustrated in FIG. 3, wherein a first implementation 180 contains a correct source code segment, a second implementation 183 introduces a non-subtle mutation into the correct source code segment, and a third implementation 187 introduces a subtle mutation into the correct source code segment, and wherein all three implementations 180, 183 and 187 are subjected to a first functional simulation (subtlety check).

First implementation 180 contains a simple pseudo code segment 182 which loops five times around a simple if-then-else statement. The if-then-else statement simply assigns I(loop increment) to O(loop increment) as long as I(loop increment) is less than or equal to five.

Given a single input vector where I(1)=1, I(2)=2, I(3)=3, I(4)=4, and I(5)=5, as illustrated at 157, pseudo code segment 182 produces an output of O(1)=1, O(2)=2, O(3)=3, O(4)=4 and O(5)=5, as illustrated at 167. In this example, this single input vector 157 represents the subtlety check of the first functional simulator.

Second implementation 183 contains a simple pseudo code segment 184 having an introduced syntactic mutation 186, such that the if-then-else statement simply assigns I(loop increment) to O(loop increment) as long as I(loop increment) is greater than or equal to five. In other words, the syntactic mutation switches the "less than (<)" logical operator to a "greater than (>)" logical operator This syntactic mutation is of the type "Incorrect Logical Term" such as indicated at 50 in FIG. 1.

Applying the same input vector 157 to the second implementation 183 as was applied in the first implementation 180 (the input vector I(1)=1, I(2)=2, I(3)=3, I(4)=4, and I(5)=5), produces an output of O(1)=0, O(2)=0, O(3)=0, O(4)=0, and O(5)=5, as illustrated at 169. This illustrates that a very small syntactic change (the reversal of a single logical operator) can result in a very large semantic change (four out of five outputs have changed between the first and second implementations). This small syntactic change/large semantic change is identified as a non-subtle mutation by the first functional simulation (subtlety check) of the present invention, since the outputs 167 and 169 are largely different between the first (correct) implementation 180 and the second mutated implementation 183, when the single vector subtlety check of the first functional simulator is applied. At this point, there is no further need to proceed with more detailed functional check of the second implementation of module A 183, since it failed the basic subtlety check.

Third implementation 187 contains a simple pseudo code segment 188 where a syntactic mutation has been introduced 190, such that the if-then-else statement simply assigns I(loop increment to O(loop increment) as long as I(loop increment) is less than or equal to six. In this example, the simple syntactic mutation inserted is a simple typographical error (changing a "5" to a "6" in the "if-then-else" statement). This syntactic mutation is of the type "Incorrect Numerical Value" (FIG. 1, element 52).

Applying the same input vector 157 to the third implementation 187 as was applied in the first implementation 180 and the second implementation 183 (the input vector I(1)=1, I(2)=2, I(3)=3, I(4)=4, and I(5)=5), produces an output of O(1)=1, O(2)=2, O(3)=3, O(4)=4, and O(5)=5, as illustrated at 171. In this instance, the very small syntactic change results in a very small semantic change. This small syntactic change/small semantic change is identified as a subtle mutation by the first functional simulation (subtlety check) of the present invention, since the outputs 167 and 171 are identical between first (correct) implementation 180 and third mutated implementation 187, when the single vector subtlety check is applied. In this instance, the first functional simulator classifies the mutation as a subtle mutation. As a result, a second functional simulation (full regression test) is required in order to attempt the detection of the subtle mutation, as illustrated in FIG. 5.

Figure 5:
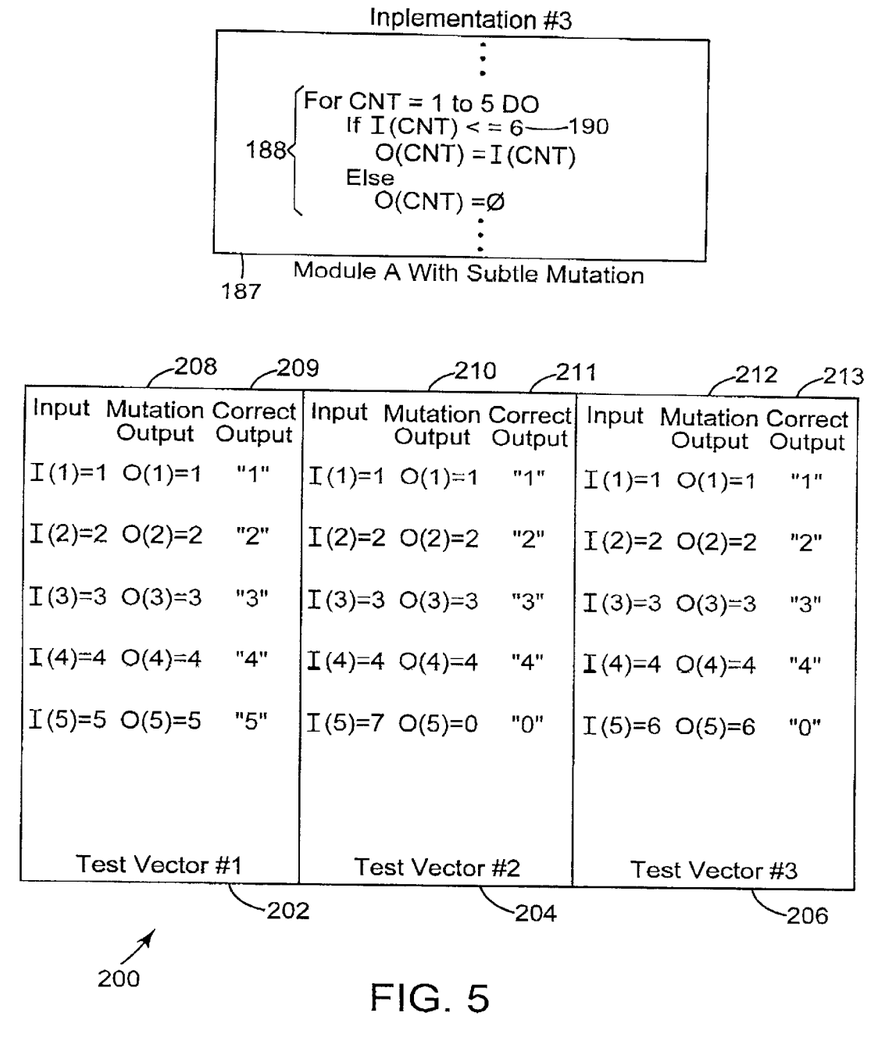
FIG. 5 illustrates the third implementation of the source code module illustrated in FIG. 4, wherein the third implementation introduces a subtle mutation into the correct source code segment, and wherein the third implementation is subjected to a second functional simulation (full regression check) which is able to detect the subtle mutation.

FIG. 5 illustrates third implementation 187 of the source code module illustrated in FIG. 4, wherein the third implementation introduces a subtle mutation into the correct source code segment, and wherein the third implementation is subjected to a second functional simulation (full regression check) in an attempt to detect the subtle mutation.

As previously described in FIG. 4, third implementation 187 contains a simple pseudo code segment 188 where a syntactic mutation has been introduced 190, such that the if-then-else statement simply assigns I(loop increment to O(loop increment) as long as I(loop increment) is less than or equal to six. In this example, the simple syntactic mutation inserted is a simple typographical error (changing a "5" to a "6" in the "if-then-else" statement). This syntactic mutation is of the type "Incorrect Numerical Value" (FIG. 1, element 52).

In this example, a three-vector regression test 200 is applied via the second functional simulator to the mutated source code 187. A first test vector 202 of I(1)=1, I(2)=2, I(3)=3, I(4)=4, and I(5)=5 applied to the computer program produces an output of O(1)=1, O(2)=2, O(3)=3, O(4)=4, and O(5) =5 from the mutated computer program, as illustrated at 208. The output when first test vector 202 is applied to the correct (non-mutated) computer program is O(1)=1, O(2)=2, O(3)=3, O(4)=4, and O(5)=5, as illustrated at 209. Thus, first test vector 202 of regression test suite 200 (second functional simulator) is unable to detect the subtle mutation present within the mutated computer program.

In a similar manner, second test vector 204 of I(1)=1, I(2)=2, I(3)=3, I(4)=4, and I(5)=7 produces an output of O(1)=1, O(2)=2, O(3)=3, O(4)=4, and O(5)=0 from the mutated computer program, as illustrated at 210. The output when second test vector 204 is applied to a non-mutated computer program is O(1)=1, O(2)=2, O(3)=3, O(4)=4, and O(5)=0, as illustrated at 211. Thus, second test vector 204 of regression test suite 200 (second functional simulator) is unable to detect the subtle mutation present within the mutated computer program.

Finally, third test vector 206 of I(1)=1, I(2)=2, I(3)=3, I(4)=4, and I(5)=6 produces an output of O(1)=1, O(2)=2, O(3)=3, O(4)=4, and O(5)=6 from the mutated computer program, as illustrated at 212. The output when third test vector 206 is applied to a non-mutated computer program is O(1)=1, O(2)=2, O(3)=3, O(4)=4, and O(5)=0, as illustrated at 213. Thus, third test vector 206 of regression test suite 200 (second functional simulator) is able to detect an operational difference between the correct (non-mutated) computer program and the mutated program. In this instance, the subtle mutation was detected within a predetermined quantity of testing, so no enhancement of the test suite 200 is required.

Figure 6:
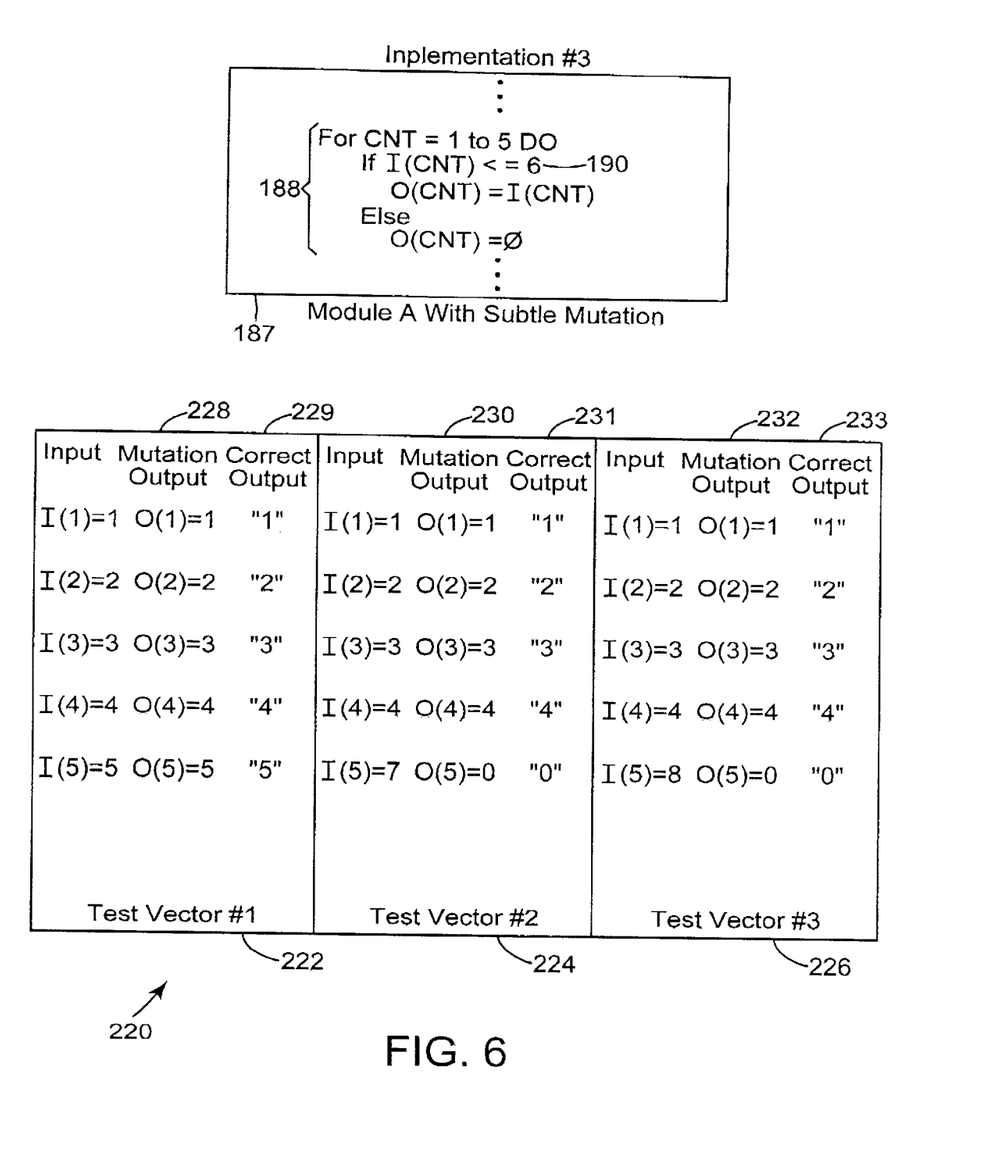
FIG. 6 illustrates the third implementation of the source code module illustrated in FIG. 4, wherein the third implementation introduces a subtle mutation into the correct source code segment, and wherein the third implementation is subjected to a second functional simulation (full regression check) which is not able to detect the subtle mutation.

FIG. 6 illustrates the third implementation of the source code module illustrated in FIG. 4, wherein the third implementation introduces a subtle mutation into the correct source code segment, and wherein the third implementation is subjected to a second functional simulation (full regression check) which is not able to detect the subtle mutation.

As previously described in FIG. 4, third implementation 187 contains a simple pseudo code segment 188 where a syntactic mutation has been introduced 190, such that the if-then-else statement simply assigns I(loop increment to O(loop increment) as long as I(loop increment) is less than or equal to six. In this example, the simple syntactic mutation inserted is a simple typographical error (changing a "5" to a "6" in the "if-then-else" statement). This syntactic mutation is of the type "Incorrect Numerical Value" (FIG. 1, element 52).

In this example, a three-vector regression test 220 is applied via the second functional simulator to the mutated source code 188. A first test vector 222 of I(1)=1, I(2)=2, I(3)=3, I(4)=4, and I(5)=5 applied to the mutated computer program produces an output of O(1)=1, O(2)=2, O(3)=3, O(4)=4, and O(5)=5 from the mutated computer program, as illustrated at 228. The output when first test vector 222 is applied to a non-mutated computer program is O(1)=1, O(2)=2, O(3)=3, O(4)=4, and O(5)=5, as illustrated at 229. Thus, first test vector 222 of the regression test suite 220 (second functional simulator) is unable to detect the subtle mutation present within the mutated computer program.

In a similar manner, second test vector 224 of I(1)=1, I(2)=2, I(3)=3, I(4)=4, and I(5)=7 produces an output of O(1)=1, O(2)=2, O(3)=3, O(4)=4, and O(5)=0 from the mutated computer program, as illustrated at 230. The output when second test vector 204 is applied to a non-mutated computer program is O(1)=1, O(2)=2, O(3)=3, O(4)=4, and O(5)=0, as illustrated at 231. Thus, second test vector 224 of regression test suite 220 (second functional simulator) is unable to detect the subtle mutation present within the mutated computer program.

Finally, third test vector 226 of I(1)=1, I(2)=2, I(3)=3, I(4)=4, and I(5)=8 produces an output of O(1)=1, O(2)=2, O(3)=3, O(4)=4, and O(5)=0 from the mutated computer program, as illustrated at 232. The output when third test vector 226 is applied to a non-mutated computer program is O(1)=1, O(2)=2, O(3)=3, O(4)=4, and O(5)=0, as illustrated at 233. Thus, third test vector 226 of regression test suite 220 (second functional simulator) is not able to detect an operational difference between the correct (non-mutated) computer program and the mutated program.

Since none of the test vectors 222, 224 and 226 of test suite 220 were able to detect the subtle mutation in the mutated computer program, test suite 220 is enhanced such that the subtle mutation in the mutated computer program can be detected. In the illustrated example, adding a fourth test vector where I(1)=1, I(2)=2, I(3)=3, I(4)=4, and I(5)=6 to regression test suite 220 enables the regression test suite to detect the subtle mutation in the mutated computer program.

Figure 7:
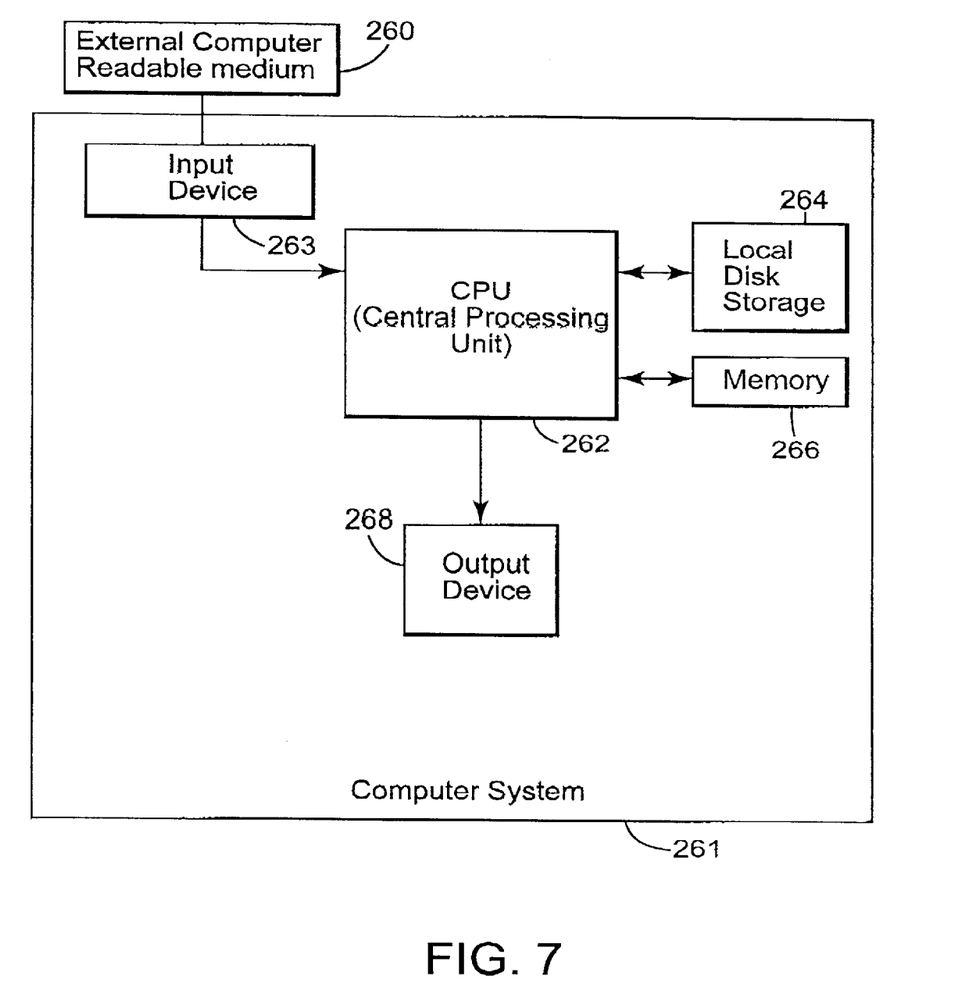
FIG. 7 illustrates a computer readable medium incorporating a functional testing system in accordance with the present invention.

FIG. 7 illustrates a computer system 261 and an external computer readable medium 260 incorporating functional testing system 22 accordance with the present invention. Embodiments of external computer readable medium 260 include but are not limited to: a CD-ROM, a floppy disk, and a disk cartridge. Functional testing system 22 of the present invention can be implemented in a variety of compiled and interpreted computer languages. External computer readable medium 260 stores source code, object code, executable code, shell scripts and/or dynamic link libraries for functional testing system 22. An input device 263 reads external computer readable medium 260 and provides this data to computer system 261. Embodiments of input device 263 include but are not limited to: a CD-ROM reader, a floppy disk drive, and a data cartridge reader.

Computer system 261 includes a central processing unit 263 for executing functional testing system 22. Computer system 261 also includes local disk storage 64 for locally storing functional testing system 22 before, during and after execution. Functional testing system 22 and its associated environment also utilizes memory 266 within the computer system during execution. Upon execution of functional testing system 22, output data is produced and directed to output device 268. Embodiments of output device 268 include but are not limited to: a computer display device, a printer, and/or a disk storage device.

While prior art software functional testing and verification systems have focused on mutations that are small syntactically without consideration to semantic size, the present invention provides an apparatus and method for quickly identifying the semantic size of small syntactic faults. The present invention quickly filters out easily detectable syntactically small mutations (i.e. non-subtle mutations) having a large semantic size, since these mutations do not increase the robustness of the test suite, and directs the simulation and verification resources toward the detection of small mutations having a small semantic size (i.e., subtle mutations), since the detection of these subtle mutations enhances the robustness of the test suite.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A functional testing system for functionally simulating and verifying a computer program, the system comprising:

a mutation generator for generating a series of mutated computer programs, wherein each mutated computer program has a syntactic mutation;

a first functional simulator for serially processing each mutated computer program, wherein the first functional simulator identifies whether the syntactic mutation in each mutated computer program is a non-subtle syntactic mutation and terminates the functional simulation of each mutated computer program having an identified non-subtle syntactic mutation, and wherein each syntactic mutation not identified as a non-subtle mutation is identified as a subtle mutation; and a second functional simulator for serially processing each mutated computer program having a subtle syntactic mutation, wherein the second functional simulator terminates the functional simulation of each mutated computer program if it detects the subtle syntactic mutation within a predetermined simulation period, and wherein the second functional simulator provides an indication that the subtle syntactic mutation was not detected if it does not detect the subtle syntactic mutation within the predetermined simulation period.

2. The functional testing system of claim 1, wherein the computer program comprises a plurality of source code modules.

3. The functional testing system of claim 2, wherein the plurality of source code modules are functional models of an integrated circuit.

4. The functional testing system of claim 2, wherein the mutation generator identifies a set of eligible source code modules from the plurality of source code modules, and wherein the set of eligible source code modules are candidates for insertion of a syntactic mutation.

5. The functional testing system of claim 4, wherein a member of the set of eligible source code modules is selected randomly, and a syntactic mutation is inserted within the member of the set of eligible source code modules.

6. The functional testing system of claim 4, wherein the selection of the member of the set of eligible source code modules occurs according to a given distribution scheme.

7. The functional testing system of claim 1, wherein the mutation generator randomly selects a syntactic mutation from a predefined set of syntactic mutation types.

8. The functional testing system of claim 7, wherein the predefined set of syntactic mutation types includes a logical negation error.

9. The functional testing system of claim 7, wherein the predefined set of syntactic mutation types includes a logical term omission.

10. The functional testing system of claim 7, wherein the predefined set of syntactic mutation types includes a logical factor omission.

11. The functional testing system of claim 7, wherein the predefined set of syntactic mutation types includes an incorrect logical term.

12. The functional testing system of claim 7, wherein the predefined set of syntactic mutation types includes an incorrect logical factor.

13. The functional testing system of claim 7, wherein the predefined set of syntactic mutation types includes an incorrect numerical value.

14. The functional testing system of claim 7, wherein the predefined set of syntactic mutation types includes a case omission.

15. The functional testing system of claim 1, wherein the mutation generator selects a syntactic mutation from a predefined set of syntactic mutation types according to a distribution scheme, wherein the distribution scheme reflects actual operating conditions of the computer program.

16. The functional testing system of claim 1, wherein upon completion of the functional simulation, the functional testing system provides a user with a statistically derived probability that undetected actual mutations still reside within the computer program.

17. A method for functionally simulating and verifying the correctness of a computer program, the method comprising the steps of:
  a) generating a mutated computer program, wherein the mutated computer program includes a syntactic mutation;
  b) pre-processing the mutated computer program to identify the syntactic mutation within the mutated computer program as either a subtle or non-subtle syntactic mutation;
  c) if the mutated computer program has a non-subtle syntactic mutation, terminating the functional simulation of the mutated computer program, then returning to step (a) to generate another mutated computer program;
  d) simulating the mutated computer program having the subtle syntactic mutation to attempt to detect the subtle syntactic mutation within the mutated computer program within a predetermined simulation period;
  e) if the subtle syntactic mutation is detected within a predetermined simulation period, terminating the functional simulation of the mutated computer program and returning to step (a) to generate another mutated computer program; and
  f) if the subtle syntactic mutation is not detected within a predetermined simulation period, indicating that the subtle syntactic mutation was not detected.

18. The method of claim 17, wherein the computer program comprises a plurality of source code modules.

19. The method of claim 18, wherein the plurality of source code modules are functional models of an integrated circuit.

20. The method of claim 18, wherein the mutation generator identifies a set of eligible source code modules from the plurality of source code modules, and wherein the set of eligible source code modules are candidates for insertion of a syntactic mutation.

21. The method of claim 20, wherein a member of the set of eligible source code modules is selected randomly, and a syntactic mutation is inserted within the member of the set of eligible source code modules.

22. The method of claim 20, wherein the selection of the member of the set of eligible source code modules occurs according to a given distribution scheme, wherein the distribution scheme reflects actual operating conditions of the computer program.

23. The method of claim 17, wherein the mutation generator randomly selects a syntactic mutation from a predefined set of syntactic mutation types.

24. The method of claim 23, wherein the predefined set of syntactic mutation types includes a logical negation error.

25. The method of claim 23, wherein the predefined set of syntactic mutation types includes a logical term omission.

26. The method of claim 23, wherein the predefined set of syntactic mutation types includes a logical factor omission.

27. The method of claim 23, wherein the predefined set of syntactic mutation types includes an incorrect logical term.

28. The method of claim 23, wherein the predefined set of syntactic mutation types includes an incorrect logical factor.

29. The method of claim 23, wherein the predefined set of syntactic mutation types includes an incorrect numerical value.

30. The method of claim 23, wherein the predefined set of syntactic mutation types includes a case omission.

31. The method of claim 17, wherein the mutation generator selects a syntactic mutation from a predefined set of syntactic mutation types according to a distribution scheme, wherein the distribution scheme reflects actual operating conditions of the computer program.

32. The method of claim 17, wherein upon completion of the functional simulation, the functional testing system provides a user with a statistically derived probability that undetected actual mutations still reside within the computer program.

33. A computer readable medium containing instructions for controlling a computer system to perform a method comprising the steps of:
  a) generating a mutated computer program, wherein the mutated computer program includes a syntactic mutation;
  b) pre-processing the mutated computer program to identify the syntactic mutation within the mutated computer program as either a subtle or non-subtle syntactic mutation;
  c) if the mutated computer program has a non-subtle syntactic mutation, terminating the functional simulation of the mutated computer program, then returning to step (a) to generate another mutated computer program;
  d) simulating the mutated computer program having the subtle syntactic mutation to attempt to detect the subtle syntactic mutation within the mutated computer program within a predetermined simulation period;
  e) if the subtle syntactic mutation is detected within a predetermined simulation period, terminating the functional simulation of the mutated computer program and returning to step (a) to generate another mutated computer program; and
  f) if the subtle syntactic mutation is not detected within a predetermined simulation period, indicating that the subtle syntactic mutation was not detected.

* * * * *